Oct. 7, 1958   E. H. LAND ET AL   2,854,903
PHOTOGRAPHIC APPARATUS
Filed March 8, 1955   4 Sheets-Sheet 1
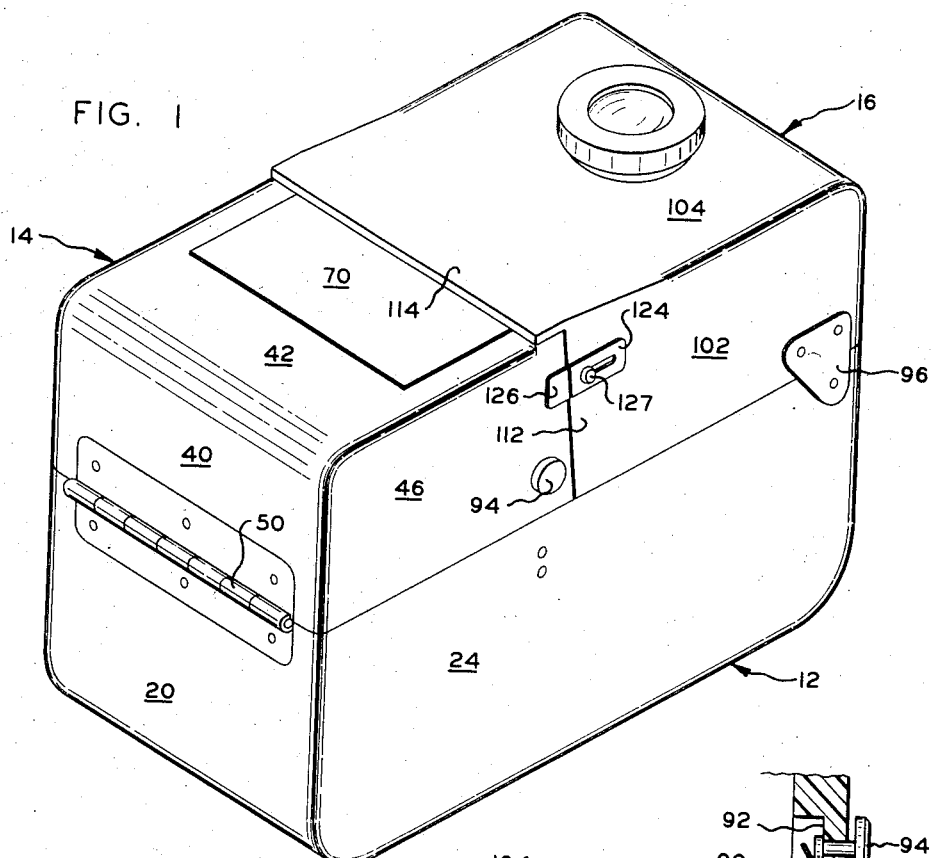
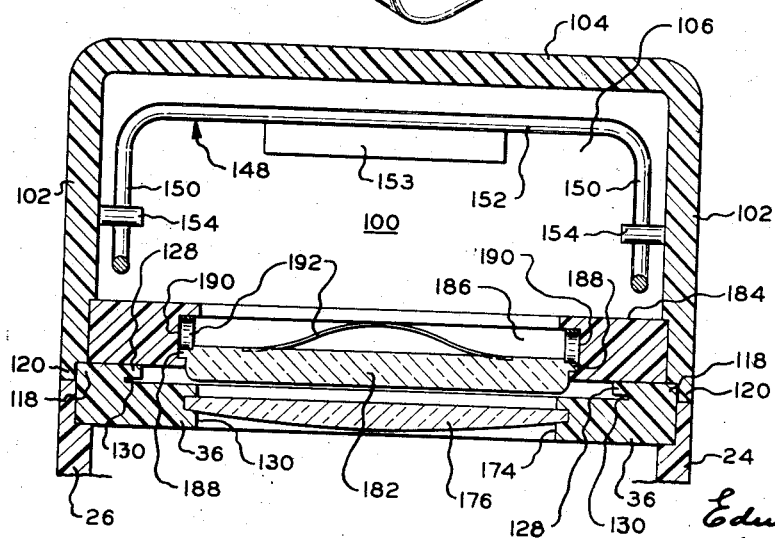
INVENTORS
Edwin H. Land
Vaito K. Eloranta
BY Brown and McMulkin
ATTORNEYS

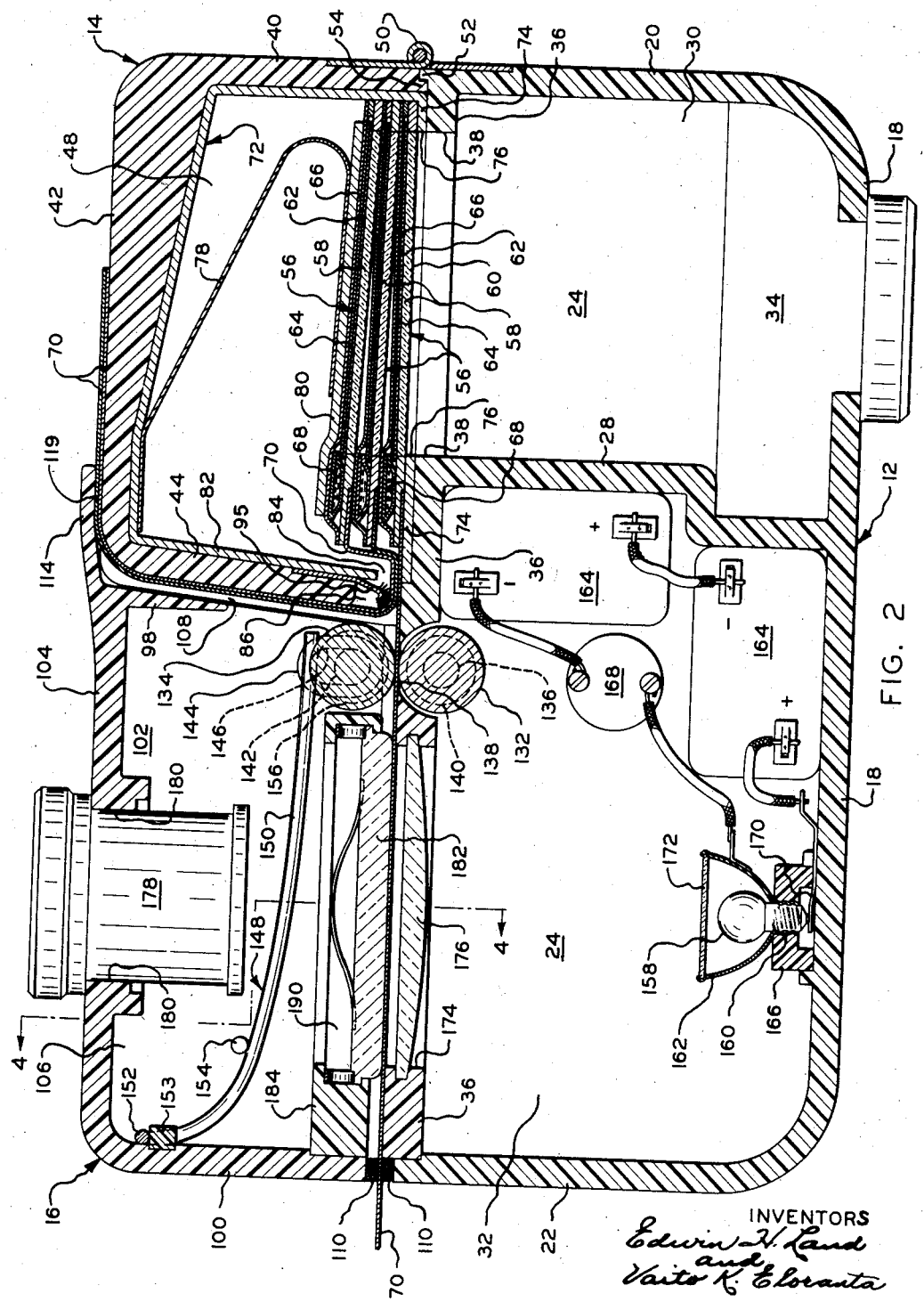

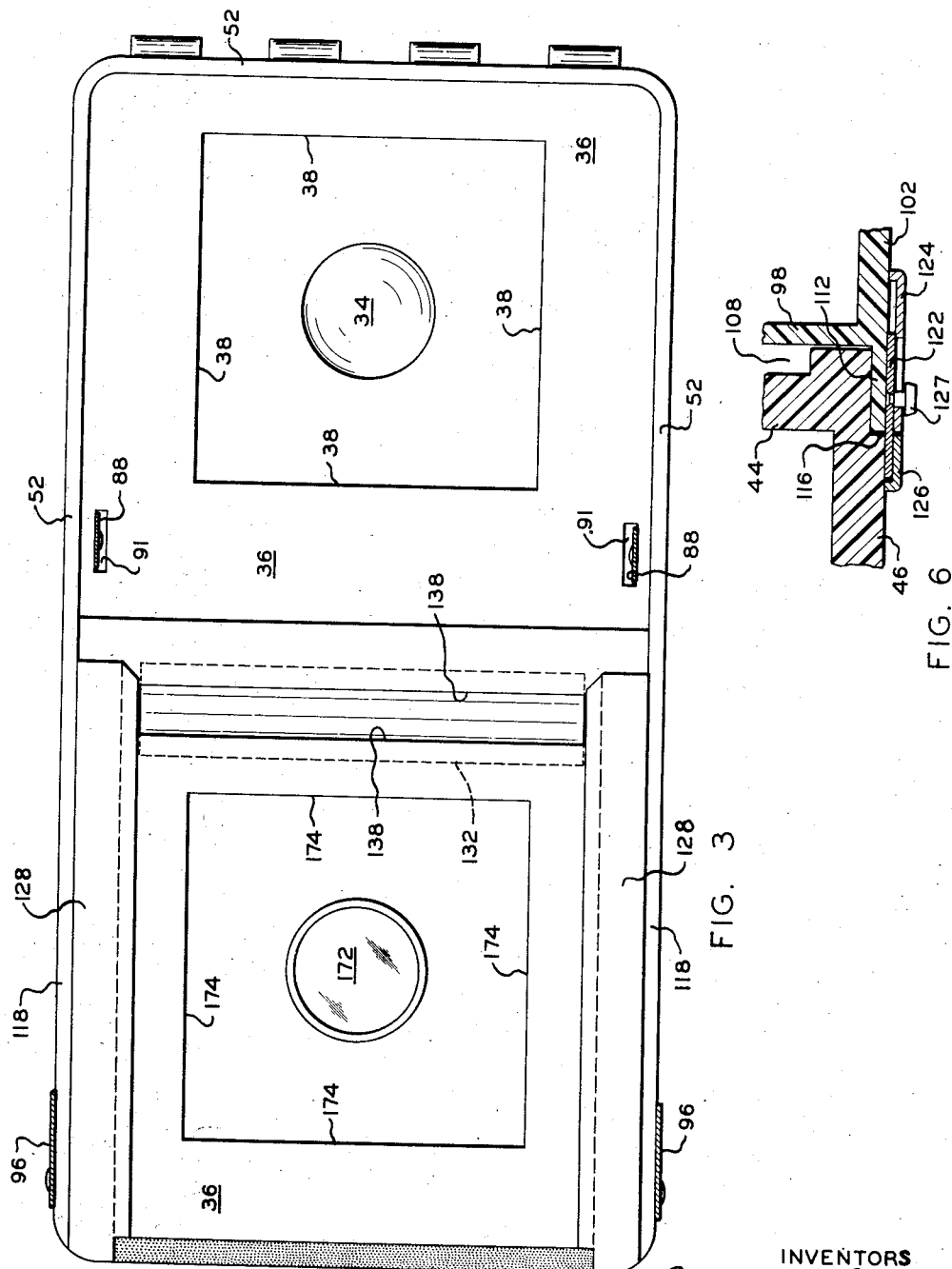

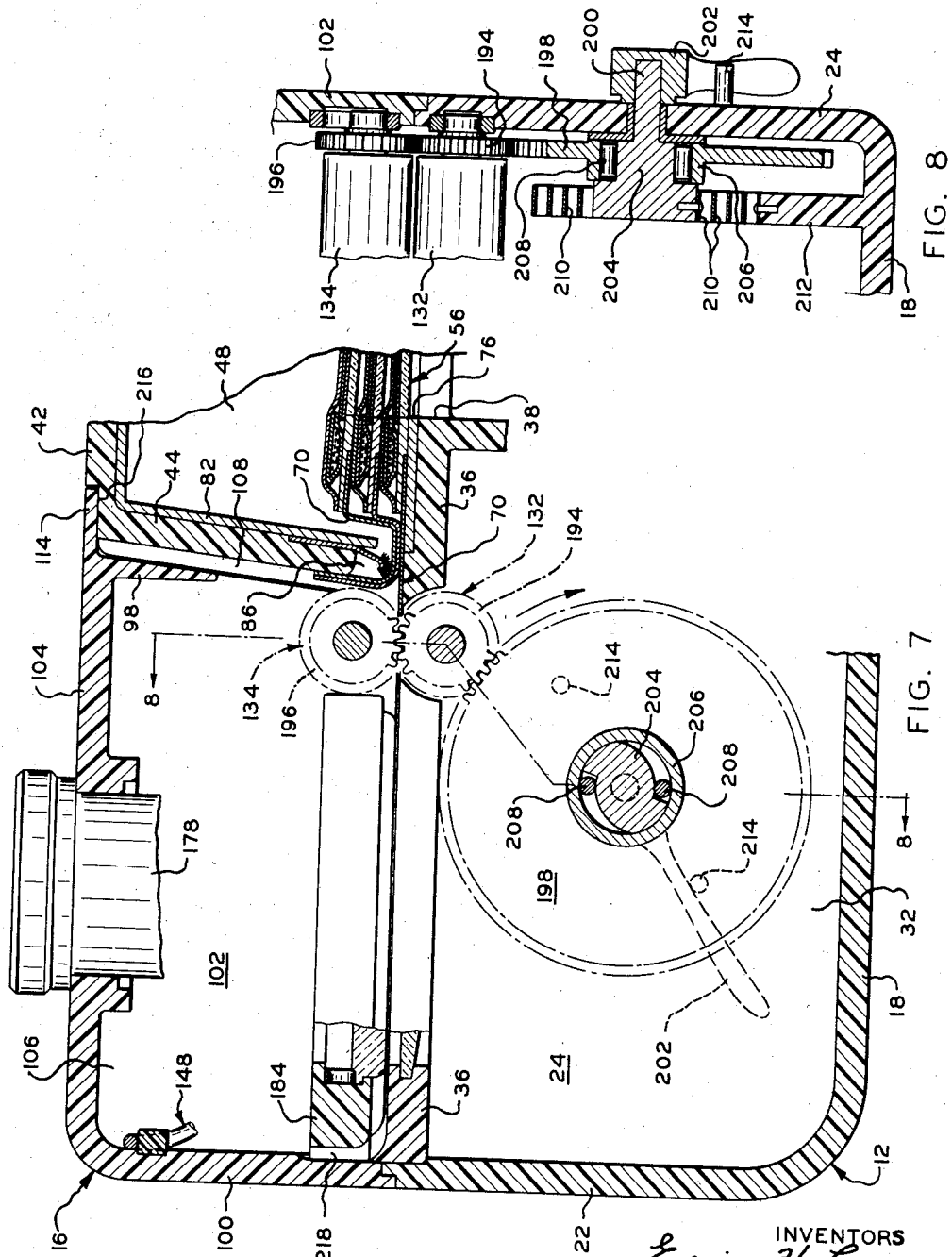

United States Patent Office 2,854,903
Patented Oct. 7, 1958

2,854,903

PHOTOGRAPHIC APPARATUS

Edwin H. Land, Cambridge, and Vaito K. Eloranta, Needham, Mass., assignors to Polaroid Corporation, Cambridge, Mass., a corporation of Delaware Application March 8, 1955, Serial No. 492,848

18 Claims. (Cl. 95—12.21)

This invention relates to photography and particularly to novel photographic apparatus for exposing, processing and viewing photographic film assemblages.

An object of the present invention is to provide novel photographic apparatus comprising means for exposing the photosensitive element of a photographic film assemblage, processing the film assemblage to produce a visible image and thereafter viewing the image.

Another object of the present invention is to provide novel photographic apparatus comprising means for exposing the photosensitive element of a photographic film assemblage through a lenticular element included in said assemblage to produce a composite latent image of a scene, the image being composed of a multiplicity of minute juxtaposed components representing, for example, primary colors present in the taking light, means for processing the film assemblage to produce a composite visible record of the latent image and means for viewing the record to reproduce in color the scene depicted.

A further object of the present invention is to provide a camera comprising a first chamber in which the photosensitive element of a film assemblage positioned within the chamber may be exposed to actinic light, a second chamber adjacent said first chamber and in which said assemblage is positioned during processing, means for distributing a processing composition within said assemblage during movement of the latter from said first to said second chamber, said processing composition being so constituted as to produce a visible image in said assemblage, and means for viewing the image produced in said assemblage positioned within said second chamber.

Still another object of the present invention is to provide a camera including a housing comprising a forward section and two movable rear sections secured to said forward section, the first of said rear sections providing a light-free environment in which a plurality of photographs film assemblages may be housed and positioned for exposure to actinic light transmitted by exposure means mounted in said forward section, the second of said rear sections mounting means for distributing a processing composition within said assemblage during movement of the latter from said first to said second section and providing a light-free environment in which said film assemblage is positioned during processing, said forward and second rear sections including means for viewing film assemblages processed in said second section.

Still a further object of the present invention is to provide, in a camera of the above type, exposure and processing means for producing, in a film assemblage including a transparent lenticular element, a composite photographic record comprising a multiplicity of minute juxtaposed components representing primary colors present in the taking light; and to provide means including a source of illumination for viewing such a record to reproduce in color the scene depicted.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of a camera embodying the present invention;

Fig. 2 is a sectional view of the camera of Fig. 1 illustrated with a supply of film assemblages in position for exposure;

Fig. 3 is a rear plan view of the camera of Fig. 1 with two rear housing sections removed;

Fig. 4 is a fragmentary sectional view taken along the line 4—4 of Fig. 2;

Fig. 5 is a view in section of a portion of the housing showing latch means for retaining the rear housing sections in closed position;

Fig. 6 is a view in section of a portion of the housing showing another latch means for retaining one of the rear housing sections in closed position;

Fig. 7 is a partial sectional view of another form of camera embodying the present invention; and Fig. 8 is a sectional view of a part of the mechanism of the camera of Fig. 7 taken substantially along the line 8—8 of Fig. 7.

Generally, the present invention contemplates the provision of a novel, inexpensive combination camera and viewer for taking, processing and viewing photographic prints and particularly prints formed and viewable through a transparent lenticular element such as lenticular color prints. The camera is relatively small, preferably being only sufficiently large to produce a transparency, for example approximately 1½ inches square, and includes means for housing a supply of film assemblages, means for positioning each film assemblage for exposure, means for effecting the distribution of processing composition carried by each assemblage within the assemblage following exposure and means including a source of illumination for viewing the positive print within the camera when processing is complete. More specifically, the camera includes a first chamber in which the film assemblage is exposed, a processing chamber in which the film assemblage is positioned during processing, means for distributing the processing composition within the assemblage during movement of the latter from the first to the second chamber, and means within said second or processing chamber for viewing the assemblage positioned within the chamber when processing is complete. The camera includes a housing having a forward section and two rear sections each pivotally mounted adjacent the other on the forward section, the forward section mounting exposure means and components of a viewer, and the two rear sections providing the aforementioned first and second chambers in which the film assemblages are, respectively, housed and exposed, and processed and viewed. The novel construction of the herein disclosed combination camera and viewer is such as to permit the insertion of a package containing a plurality of film assemblages into the camera, the successive exposure of the assemblages and the immediate processing and viewing of each assemblage entirely within the camera without the necessity for removing it from the camera.

The herein disclosed camera may be adapted to the production and viewing of many types of photographic records, for example, lenticular type stereoscopic records, and is particularly adapted to lenticular color processes wherein the taking lens includes means such as color filters for separating the taking light into component primary colors, and a photosensitive emulsion layer is exposed through a transparent layer or film disposed immediately adjacent or formed integrally with the emulsion layer and having a goffered surface composed of a multiplicity of minute optical elements or lenticules. A visible photographic record is formed from the exposed emulsion layer in the camera and may be viewed or projected in a manner which is similar to the taking process so as to reproduce in color the scene depicted. This may be effected by placing at the source of illumination, means such as color filters similar to those employed in taking for separating the illuminating light into the same primary colors as in taking and directing the illuminating light through the transparent goffered element disposed immediately adjacent or formed integrally with the visible record. The latent image formed in the emulsion layer and the visible photographic record comprise a multiplicity of interlaced image components, each underlying one of the minute optical elements or lenticules and each composed of a plurality of elements representing the intensities of the primaries in the taking light forming the image component.

Referring now to the drawings, wherein like numerals denote like parts, there is illustrated a novel camera embodying the present invention, illustrated with a plurality of film assemblages in position for exposure. The camera comprises a housing including a forward section 12 and two rear sections 14 and 16 pivotally mounted side by side on the rear of forward section 12. Forward section 12 is generally rectangular and comprises walls 18, 20, 22, 24 and 26 designated for purposes of description as front, top, bottom, side and side, respectively. Forward section 12 includes an intermediate wall 28 located between top and bottom walls 20 and 22 and dividing the forward housing section into upper and lower forward chambers designated 30 and 32, respectively. A suitable lens and shutter assembly 34 is secured to the upper portion of front wall 18, chamber 30 providing an optical path between the lens of assembly 34 and a film assemblage positioned for exposure at the rear of said chamber. As a means for positioning a film assemblage for exposure at the rear of chamber 30, forward section 12 is provided with a rear wall 36 having a rectangular aperture 38 through which actinic light may be transmitted from the lens to a film assemblage retained in position for exposure against the rear surface of rear wall 36.

Rear section 14 is generally rectangular in shape and includes a top wall 40, rear wall 42, bottom wall 44 and two parallel side walls 46, forming a generally rectangular chamber 48 open at the front and in which a supply of photographic film assemblages may be positioned. Rear section 14 is pivotally secured to the upper portion of forward section 12 by a hinge 50 secured in upper walls 20 and 40 of front section 12 and rear section 14, respectively, so that the upper and side walls of the two sections are in substantially the same planes when rear section 14 is in a closed or operative position (see Fig. 2) against rear wall 36. As a means for excluding light from chambers 30 and 48 when rear section 14 is in closed position, rear wall 36 is provided with shoulders 52 along its margins adapted to engage and cooperate with corresponding shoulders 54 on the forward edges of upper wall 40 and side walls 46 of rear section 14.

Latch means are provided for securing rear section 14 in closed position and in the form shown comprise a pair of deformable latch members 88 secured to side walls 24 and 26 of forward section 12 and each having a re-entrant engagement section 90 adapted to extend through a slot 91 in wall 38 and be engaged in one of a pair of recesses 92 in side walls 46 of first forward section 12. As a means for releasing latch members 88 from engagement in recesses 92 to permit the rearward pivotal movement of rear section 14, there is provided a pair of release buttons 94 each extending through a hole in a side wall 46 underlying a latch member 88 and adapted to be manually depressed for deforming a latch member so as to release the engagement section 90 thereof from engagement in a recess 92.

A supply of film assemblages of the type suitable for use in the camera of the present invention is shown in Fig. 1 positioned within chamber 48 and the thicknesses of the materials comprising the assemblages are greatly exaggerated for clarity of illustration. Each film assemblage 56 comprises a transparent support or film 58 having one surface thereof goffered with a multiplicity of minute optical elements or lenticules 60 and provided on the other side thereof with an image-receiving layer 62 and a photosensitive layer 64, image-receiving layer 62 being located next to support layer 58. Additionally, each film assemblage includes an opaque backing layer 66 which provides an outermost layer for the assemblage, a rupturable container 68 secured to backing layer 66 adjacent one end of the assemblage between the backing layer and photosensitive layer 64 and an elongated leader 70 secured to lenticular support 58 at the end adjacent container 68. Exposure of the film assemblage 56 is through lenticular support 58, lenticular surface 60 thereof acting to suitably direct the light onto various portions of photosensitive layer 64, positioned substantially at the focus of the lenticules. In order to carry this out, image-receiving layer 62 is, of course, of a transparent material.

Backing layer 66 provides an outermost layer for the assemblage, permitting both photosensitive layer 64 and image-receiving layer 62 to be located at one side of container 68. In the film structure illustrated, image-receiving layer 62 is made extremely thin so as to provide a structure which is substantially the equivalent of a photosensitive layer disposed immediately adjacent a lenticular layer. It is essential that substantially the same registration be maintained between both the lenticules and the emulsion layer and between the lenticules and the visible photographic record. It is by virtue of this arrangement that not only is parallax reduced to a minimum during taking and viewing but substantially perfect registration between the latent and visible images and the lenticules is maintained during both taking and viewing.

The liquid carried by container 68 is preferably capable of effecting a diffusion transfer-reversal process when impregnated into photosensitive layer 64, the backing layer 66 aiding in the distribution of the processing liquid upon said photosensitive layer. The film assemblage includes all the layers required to effect this process, photosensitive layer 64 preferably comprising an emulsion of silver halide in which a latent image may be attained by differential exposure to actinic light and the liquid within container 68 preferably including a film-forming reagent such, for example, as carboxymethyl cellulose and also serves as a solvent for a silver halide developer and a silver halide fixer, both of which may be included in the liquid or incorporated in some layer of the film assemblage into which the processing reagent is impregnated. The liquid contents of container 68, when distributed upon the photosensitive layer, permeate or impregnate that layer and the exposed silver halide is reduced to silver and unreduced silver halide forms a complex silver salt which diffuses through the photosensitive layer to the image-receiving layer where it is reduced to silver to form a visible print.

In use following exposure, the film assemblage 56 is adapted to be processed in the absence of actinic light by moving the assemblage between a pair of pressure-applying members, preferably rollers, to rupture the container and spread its liquid contents between backing layer 66 and photosensitive layer 64. This processing is carried out in the absence of actinic light for a period, for example, of from 40 to 120 seconds after which the lenticular layer or transparent support 58, together with the image-receiving layer 62, is separated as by stripping from photosensitive layer 64 and backing layer 66, the organic film-forming constituent of the processing composition being adapted to bond a photosensitive layer 64 to a backing layer 66 by a bond which is stronger than the bond between the photosensitive layer and the image-receiving layer. The foregoing and other types of film assemblages and processes suitable for use in the present invention are disclosed in detail in copending application Serial No. 265,413, filed January 8, 1952, now Patent No. 2,726,154.

It has been discovered that the density of the positive image produced by silver halide diffusion transfer-reversal processes may be much greater than the density of the negative image. This intensification in the density of the positive image has been found to be of the order of 5 to 6 times, thus making it possible to allow the negative and positive images to remain in contact with each other. This, of course, may result in some graying of the highlights of the positive image but is generally unobjectionable particularly for projection and viewing purposes since there is considerable difference in density between positive and negative images. This arrangement makes it possible to give added structural strength and rigidity to the finished assemblage by providing a backing layer 66 of a transparent material such as that employed for the lenticular layer 58 and which is not stripped with photosensitive layer 64 from image-receiving layer 62 but is permitted to remain in contact with photosensitive layer 64, the latter remaining in contact with image-receiving layer 62. However, in the form of camera shown, it is essential that there be provided a backing layer or another layer between successive film assemblages which is opaque to actinic light at least during exposure to prevent exposure of all the film assemblages behind the one being exposed. One solution for this problem may be found in the provision of a dye in the backing layer normally rendering the layer opaque to actinic light and a reagent in the container adapted to react with the dye to render the backing layer at least translucent when the liquid contents of the container are distributed between the backing layer and the photosensitive layer. Another solution to this problem resides in the provision of an opaque slide which may be inserted between the film assemblage to be exposed and the next successive film assemblage. For this purpose a passage may be provided, for example in upper wall 40 of the housing, through which the slide could be inserted behind a film assemblage positioned for exposure and, following exposure, removed and again inserted behind the next successive film assemblage positioned for exposure when the previous exposed film assemblage has been withdrawn from the exposure chamber.

A supply of film assemblages 56 may be furnished, for example in a magazine or an envelope 72 formed of an opaque sheet material such as paper, cardboard and the like, or some other suitable material which permits the envelope to be made inexpensively and hence disposable after use. The envelope is shown as being thicker at one end in order to accommodate the greater cross-sectional bulk of the film assemblages due to the added thickness of container 68 and is sufficiently long to accommodate the film assemblages and attached leaders 70. The front wall 74 of envelope 72 is provided with an exposure aperture 76, corresponding in size and shape to exposure aperture 38, through which actinic light is transmitted to film assemblages contained in envelope 72. As a means for urging the film assemblages into position for exposure against front wall 74 and wall 36, a U-shaped spring 78 is provided within envelope 72 and secured at one end to the rear wall of the envelope and at the other end to a follower plate 80 adapted to bear against the film assemblages. An end wall 82 of envelope 72 is provided with a passage 84, adjacent front wall 72, through which leaders 70 project and through which the film assemblages may be withdrawn from the envelope. The envelope is supplied with a removable slide (not shown) for closing aperture 76, the slide being adapted to be withdrawn through passage 84 when the envelope containing film assemblages is in position within chamber 48 and rear section 14 is in closed position.

When a supply of film assemblages is in position within chamber 48 and rear section 14 is in closed position, the leaders 70 secured to the film assemblages are adapted to extend from chamber 48 through a passage 86 provided between rear wall 36 and lower wall 44 of section 14. As a means for rendering passage 86 lighttight while permitting withdrawal of film assemblages through passage 86, there is provided a resilient curved member 95 secured to wall 82 and extending into passage 86 to close the latter and having a suitable tufted fabric or felt material secured thereto so as to engage a leader extending through the passage in a lighttight fashion.

Second rear section 16 is pivotally mounted on the rear of forward section 12 by a pair of hinge plates 96 secured to side walls 22 and 26 of forward section 12 adjacent bottom wall 22. Second rear section 16 includes a relatively short upper wall 98, a bottom wall 100, two side walls 102 and a rear wall 104 defining a generally rectangular second rear chamber 106.

When first and second rear sections 14 and 16 are in closed position, bottom wall 44 of first rear section 14 and upper wall 98 of second rear section 16 are disposed in substantially parallel relation to define, between their adjacent surfaces, a passage 108 extending rearward and communicating with the exterior of the camera housing. Passage 108 is adapted to accommodate leaders 70 secured to film assemblages 56 positioned within chamber 48. Another passage 110 is provided in bottom walls 22 and 100 of and between, respectively, forward housing section 12 and second rear section 16 and adapted to accommodate at least a leader 70 and preferably a processed film assemblage. Each leader 70 is sufficiently long to extend from a film assemblage 56 positioned in chamber 48 and to which it is attached, through passage 86, between upper wall 98 of rear section 16 and rear wall 36 of forward section 12, between the forward and second rear sections, through passage 110 and exteriorly of the camera housing a sufficient length to permit the operator to manually grasp said leader for drawing a film assemblage attached thereto from chamber 48, through passage 86 and into chamber 106. Since only one leader 70 at a time extends between the forward and second rear sections, the remaining leaders secured to film assemblages positioned within chamber 48 extend through passage 108 and are folded across the rear surface of wall 42. As a means for rendering passage 108 lighttight with leaders extending therethrough, side walls 102 and rear wall 104 of second rear section 16 are provided respectively with side (112) and rear (114) flanged extensions adapted to extend across the sides and rear of passage 108 and exteriorly of rear (42) and side (46) walls of first rear section 14. Side walls 46 are provided with shouldered portions 116 and are adapted to snugly engage flanges 112 in a light-tight fashion and rear flange 114 is spaced slightly rearward of rear wall 42 in substantially parallel relation thereto to provide a passage 119 communicating substantially at right angles with passage 108 and through which leaders 70 are adapted to extend.

Locking means are provided for retaining second rear section 16 in closed or operative position and, in the form shown, comprise a locking member 122 mounted for sliding movement on each of side walls 102 by a slotted cover plate 124 and adapted to extend into and be retained by a latch plate 126 mounted on each of side walls 46 of first rear section 14. To operate the locking means, each locking member 122 is provided with a manually engageable button 127 secured thereto and extending through a slot in plate 124.

As a means for rendering chamber 106 lighttight when in closed position, there is provided a right-angle shouldered portion 118 along the margins of rear wall 36 adapted to snugly seat flange portions 120 on the forward edges of side walls 102. Passage 110 is rendered lighttight by sections of tufted fabric, felt or the like secured to walls 22 and 100 in passage 110.

As a means for guiding film assemblages from chamber 48 into chamber 106 and for retaining the film assemblages in proper position within chamber 106 during processing and for viewing, the portion of rear wall 36 within chamber 106 is provided with a pair of parallel lateral members 128 preferably formed integrally therewith and defining a channel between which a film assemblage is adapted to be advanced. In order to retain each film assemblage in contact with rear wall 36 during processing and viewing and when second rear section 16 is pivoted to open position, members 128 are provided with reentrant sections 130 adapted to engage each film assemblage along its lateral margins while permitting movement from one chamber to the other and through passage 110.

Pressure-applying means are provided for engaging a film assemblage and for effecting the distribution of the processing liquid within the film assemblage during movement of the latter from chamber 48 to chamber 106 and, in the form shown, comprises a pair of pressure-applying rollers 132 and 134. The pressure rollers are mounted with their axes in parallel relation and extending transversely of the path of movement of a film assemblage from one rear chamber to the other, roller 134 being mounted within rear chamber 106 adjacent upper wall 98 and passage 86. Roller 132 is mounted on forward section 12 in position to be operatively juxtaposed with roller 134 when second rear section 16 is in closed position.

Pressure roller 132 includes a central engagement portion having a cylindrical surface and two stub shafts 136 extending from its ends. Roller 132 is pivotally mounted on forward section 12 with its cylindrical surface extending through a slot 138 in rear wall 36, stub shafts 136 being journaled in a pair of bushings 140 secured in recesses in side walls 24 and 26 so that the cylindrical surface of roller 132 is substantially tangent to the rear surface of rear wall 36. Pressure roller 134 is similar to roller 132 and includes a pair of stub shafts 142 extending from its ends and on which said roller is pivotally mounted with its axis parallel to the axis of roller 132. As a means for mounting pressure roller 134 on second rear section 16 so that it is juxtaposed with roller 132 when the rear section is in closed position and also permitting limited movement of roller 134 in a plane through its axis, there is provided a pair of mounting plates 144 secured to side walls 102 of rear section 16. Each mounting plate includes a slot 146, the axis of which is substantially perpendicular to the plane of rear wall 36 when second rear section 16 is in closed position and in which stub shafts 142 are retained for both pivotal movement and movement in a plane parallel to the axis of slots 146.

Resilient means are provided for urging roller 134 toward roller 132 and include a generally U-shaped spring 148 having two legs 150 and a connecting bight portion 152. Spring 148 is positioned within chamber 106 with legs 150 disposed adjacent side walls 102, with bight portion 152 disposed against bottom wall 100 between rear wall 104 and an elongated boss or rib 153 secured to bottom wall 100, and with the end portions of legs 150 in engagement with circumferential grooves 156 on the ends of roller 134. As a means for biasing the legs of spring 148 forward against stub shafts 142, there is provided a pair of projections 154 on side walls 102, each projection being adapted to engage a leg 150 intermediate its ends and impart a curvature to said leg.

In a preferred method of producing a composite record adapted to be viewed in color, exposure is made through tricolor filter means associated with the taking lens and including at least three elements for separating the taking light into three component primary colors. Each lenticule separately images the filter elements onto the area of the photosensitive surface underlying the lenticule to form separate images each representing the intensity of the primary present in the taking light falling on the lenticule. In a preferred form of means for viewing a composite record made by the foregoing method, the illuminating light is directed through filter means comprising at least three elements for separating the illuminating light into three primary colors and preferably the same as those in taking. The illuminating filter and elements thereof should appear to the film assemblage as being of substantially the same size and shape as the filter and elements thereof associated with the taking lens, and should appear at substantially the same position as the taking lens so that the light from the illuminating filter subtends substantially the same angle as the taking light from the taking lens.

In accordance with the present invention, means are provided for viewing a photographic record produced in the camera and preferably adapted for viewing a composite record through a lenticular element to create the appearance of color. The viewing means includes a source of illumination and filter means associated with said source, housed within forward chamber 32 of section 12, and elements of an optical system mounted on sections 12 and 16 in, respectively, chambers 32 and 106.

In the embodiment shown, the source of illumination includes a conventional electric lamp 158 mounted in a socket 160 of a reflector 162. The source of power for the lamp is a pair of conventional dry cell batteries indicated at 164 and mounted within chamber 32 adjacent intermediate wall 28. Reflector 162 may be mounted in any convenient manner and in the form shown is secured in a recessed boss 166 secured to or formed integrally with front wall 18 of section 12. Boss 166 is formed preferably of an electrically nonconducting material and the batteries are connected, for example, in series through a switch 168 to the lamp. One electrical contact with lamp 158 is made through socket 160 of reflector 162 and the other contact is made at the base of the lamp by a contact member 170 secured in recessed boss 166. Switch 168 is preferably of the push-button type and is operable manually from the exterior of the housing. Tricolor filter means designated at 172 is mounted in the opening in reflector 162 and is of such size and so positioned as to appear to a film assemblage, positioned for viewing, at the same distance and as the same size as the aperture of the shutter.

To provide an optical path between the illumination source and a film assemblage positioned for viewing within chamber 106, wall 36 includes a rectangular aperture 174 substantially the same size and shape as aperture 38. A suitable lens 176 is secured within aperture 174 for directing light from lamp 158 through the film assemblage positioned for viewing across the aperture. The viewing system includes a magnifying lens mounted, for example, in a barrel 178 at the rear of chamber 106. To permit adjustment of the focus of the magnifying lens, barrel 178 is mounted for axial movement in an opening 180 in rear wall 104 of section 16.

A diffusing means is provided in the optical path between the photographic record and the magnifying lens and in the form shown this diffusing means comprises a light-transmitting element 182 having at least a forward surface which is substantially flat and is formed of a translucent or light-diffusing material. Additionally, element 182 may comprise, for example, a condensing lens or a Fresnel lens for directing light transmitted by the film assemblage and the diffusing surface to the magnifying lens. As a means for mounting element 182, there is provided a support wall 184 secured at its edges between walls 100 and 102 adjacent and parallel to wall 36 to provide a passage therebetween through which a film assemblage may move. Support wall 184 includes a rectangular aperture 186 similar to aperture 174 and aligned therewith. Since it is important that the diffusing layer or surface of element 182 be in contact with the record during viewing, element 182 is mounted in aperture 186 for limited movement parallel to the axis of the optical system and is resiliently urged toward wall 36. Accordingly, the marginal portions of element 182 are provided with flanges 188 adapted to be retained in a channel-shaped recess 190 formed in the edge portions of wall 184 defining aperture 186. Element 182 is movable forward and backward in recesses 190 and is urged forward by four springs 192 secured within recesses 190 so that each spring exerts a forward pressure against one of the flanges 188 of element 182.

Reference is now made to Figs. 6 and 7 of the drawings wherein there is illustrated another embodiment of the present invention, like numerals being used to designate parts like those of the previous figures. The camera of Figs. 6 and 7, with certain modifications, is substantially the same as the camera of the previous figures and includes, in addition to the elements heretofore described, means for rotating pressure rollers 132 and 134 to advance an exposed film assemblage from chamber 48 into processing chamber 106. In the form shown, pressure rollers 132 and 134 have secured to one end, respectively, gears 194 and 196 adapted to mesh with one another during rotation of the rollers. As a means for driving gear 194 to rotate the rollers, there is provided a relatively large drive gear 198 pivotally mounted in forward chamber 32 on side wall 26 of forward section 12 and with its teeth meshed with gear 194 on roller 132. Gear 198 is mounted on and driven by a shaft 200 secured for rotary movement in wall 24 and having a manually operable actuating lever 202 secured to its end exteriorly of the camera housing.

Shaft 200 includes a wedge portion 204 which cooperates with an annular hub 206 on gear 198 to act as a friction catch, whereby clockwise rotation (viewing Fig. 6) of lever 202 is effective to rotate gear 198 and drive rollers 132 and 134, and lever 202 may be pivoted clockwise without causing rotation of gear 198. Wedge portion 204 of shaft 200 is located within annular hub 206 and is so formed as to define wedge-shaped spaces between portion 204 and hub 206. A pair of rounded pins or roller bearings 208 are positioned in these wedge-shaped spaces between portion 204 and hub 206 and are adapted to be wedged therebetween when lever 202 is pivoted clockwise and to ride freely within the wedge-shaped spaces when lever 202 is rotated counterclockwise.

The gears are of such size that rotation of lever 202 through an angle, for example of 120°, is effective to advance a film assemblage completely between rollers 132 and 134 and into chamber 106. Following advancement of the film assemblage into chamber 106, lever 202 is then returned to its original position, preferably for example by a torsion spring 210 secured at one end to shaft 200 and at its other end to a projection 212 on wall 18. Suitable limit stops in the form, for example, of pins 214 secured in wall 24 are provided for limiting rotary movement of lever 202.

Since the advancement of each film assemblage from one chamber to the other is effected by the rotation of the pressure rollers and not manually as described in the previous embodiment, leaders 70 are much shorter, being only sufficiently long to extend from chamber 48 into the bite of rollers 132 and 134. This method of advancing the film assemblages permits certain modifications of the camera structure, including the elimination of passage 119 for the leaders between rear flange 114 and wall 42, and passage 110 at the end of chamber 106. Rear flange 114 is seated in a recess 216 in rear wall 42 with its end adjacent the shoulder of the recess to form a lighttight joint for the camera housing. The shortened leaders, until they are threaded between the pressure rollers, extend into passage 108 between rear sections 14 and 16. The camera structure is somewhat modified to accommodate leaders 70 of a film assemblage positioned in chamber 106 within the chamber rather than advancing the latter through a passage such as passage 110 at the end of the chamber. In the form shown, this modification is represented by a passage 218 provided between bottom wall 100 and the end of support wall 184 through which a leader 70 may extend into chamber 106. Additionally, with the elimination of passage 110, second rear section 16 can be pivotally mounted on forward section 12 by hinge means similar to hinge 50.

In operation of the camera of Figs. 6 and 7, a supply of film assemblages in an envelope 72 is positioned in chamber 48 and rear section 14 is pivoted to a closed or operative position with leaders 70 extending through passage 86 between wall 44 and wall 36. The slide element for closing aperture 76 of envelope 72 may be manually withdrawn from the envelope through passage 86 and a leader 70 positioned in contact with pressure roller 132. Rear section 16 may then be pivoted to a closed or operative position, juxtapositioning rollers 132 and 134 with a leader 70 extending between the bite of the rollers. An exposure may then be made of a film assemblage 56 positioned across aperture 38, lever 202 being pivoted in a clockwise direction to rotate pressure rollers 132 and 134 and advance the exposed film assemblage between the rollers into chamber 106 between wall 36 and wall 184. When the predetermined processing period has elapsed, rear section 16 may then be opened and the backing layer 66 on the film assemblage, together with the leader 70, may be stripped therefrom to permit viewing of the photographic record of the film assemblage when rear section 16 is again pivoted to a closed position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing the photosensitive element of a film assemblage including a lenticular element and exhibiting the processed film assemblage, said apparatus comprising, in combination, first housing means, second housing means secured to said first housing means for movement with respect to said first housing means between a first position wherein it cooperates with said first housing means to provide a first chamber adapted to contain a supply of photographic film assemblages during exposure, and a second position wherein access is provided to said first chamber, means within said first chamber for successively positioning said photographic film assemblages for exposure, means mounted on said first housing means for exposing the photosensitive element of a film assemblage through the lenticular element of said film assemblage to produce a photographic record which may be exhibited in color, said exposure means including means for dividing light into at least two components of different wave length ranges, said first housing means providing an optical path for actinic light transmitted from said exposure means to said film assemblage, third housing means mounted on said first housing means adjacent said second housing means for movement between a first position wherein it cooperates with said first housing means to provide a second chamber adapted to receive an exposed film assemblage from said first chamber during processing, and a second position wherein access is provided to said second chamber, means comprising portions of said second and third housing means providing a passage connecting said first and second chambers, pressure-applying means mounted within said second chamber for engaging said exposed film assemblage during movement thereof from said first to said second chamber to effect the distribution of a processing liquid upon the photosensitive element of said exposed film assemblage, means within said second chamber for positioning said exposed film assemblage during processing and for viewing, viewing means including a source of illumination and means for dividing light from said source into at least two components of different wave length ranges within said second chamber for exhibiting in color the photographic record of a film assembly positioned and processed therein.

2. Photographic apparatus for exposing, processing and exhibiting photographic film assemblages each including a photosensitive element, a lenticular element and means containing a processing liquid, said apparatus comprising, in combination, first housing means, second housing means movably secured to said first housing means, said second housing means being movable into an operative position wherein it cooperates with said first housing means to provide a first chamber adapted to contain a supply of said film assemblages during exposure, guide means within said first chamber for positioning each of said film assemblages for exposure, means mounted on said first housing means for so exposing the photosensitive element of a film assemblage through the lenticular element of said film assemblage as to produce a composite photographic record which may be exhibited in color, said first housing means providing an optical path for transmitting light from said exposure means to a film assemblage positioned for exposure within said first chamber, third housing means movably mounted on said first housing means and movable to an operative position adjacent said second housing means wherein said third housing means cooperates with said first housing means to provide a second chamber adapted to receive a film assemblage from said first chamber during processing, portions of said second and third housing means cooperating to provide a passage connecting said first and second chambers when said second and third housing means are in operative position, means within said passage for guiding a film assemblage from said first to said second chamber, pressure-applying means within said second chamber for engaging the last-mentioned film assemblage during movement of the latter from said first to said second chamber to effect the distribution of said processing liquid within said last-mentioned assemblage, means within said second chamber for positioning said last-mentioned film assemblage during processing and for viewing, and viewing means within said second chamber for presenting in color the composite photographic record formed in a film assemblage during processing within said second chamber.

3. Photographic apparatus comprising, in combination, a first housing section, a second housing section, a third housing section, means movably securing said second and third housing sections adjacent one another to said first housing section, said first and second housing sections cooperating to provide an exposure chamber in which a film assemblage may be positioned for exposure, guide means within said exposure chamber for positioning a film assemblage for exposure, means mounted on said first housing section for exposing said film assemblage, portions of said first housing section defining an optical path between said exposure means and said film assemblage positioned for exposure, said first and third housing sections cooperating to provide a processing and viewing chamber adapted to receive a film assemblage from said exposure chamber during processing, said second and third housing sections cooperating to provide a passage connecting said exposure chamber and said processing chamber, means mounted on said first and third housing sections for effecting the distribution of a processing liquid in the photosensitive element of the last-mentioned film assemblage during movement of the latter from said exposure to said processing chamber, guide means within said processing chamber for positioning said last-mentioned film assemblage during processing and for viewing, and means within said processing chamber including an illumination source for rendering visible a film assemblage positioned and processed therein.

4. Photographic apparatus for exposing, processing and exhibiting a photographic film assemblage, said apparatus comprising, in combination, a first housing section, a second housing section, a third housing section, means securing said second and third housing sections adjacent one another to said first housing section for movement to and from operative position, said second housing section, when in operative position, cooperating with said first housing section to provide an exposure chamber, guide means within said exposure chamber for positioning a film assemblage for exposure, means including lens means mounted on said first housing section for exposing the photosensitive element of said film assemblage through the lenticular element of said film assemblage positioned within said exposure chamber so as to produce a composite photographic record adapted to be exhibited in color, portions of said first housing section defining an optical path for transmitting actinic light from said lens means to said film assemblage positioned for exposure within said exposure chamber, said third housing section, when in operative position, cooperating with said first housing section to provide a processing and viewing chamber adapted to receive a film assemblage from said exposure chamber during processing, portions of said second and third housing sections cooperating, when in operative position, to provide a passage between said exposure and processing chambers, means within said passage for guiding an exposed film assemblage from said exposure to said processing chamber, pressure-applying means mounted on said first and said third housing sections within said processing chamber for engaging said exposed film assemblage during movement of the latter from said exposure to said processing chamber to effect the distribution of a processing liquid on the photosensitive element of said exposed film assemblage, guide means within said processing chamber for positioning said exposed film assemblage during processing and for viewing, and means within said processing chamber including a source of illumination for presenting in color the composite photographic record formed in a film assemblage during processing within said chamber.

5. Photographic apparatus for exposing, processing and exhibiting a photographic film assemblage, said photographic apparatus comprising, in combination, first housing means, second housing means, means secured at one end of said first housing means for pivotally mounting said second housing means thereon, said second housing means being pivotable to a closed position wherein it cooperates with said first housing means to provide a first chamber in which a supply of photographic film assemblages may be positioned during exposure and being pivotable to an open position to permit loading of a plurality of film assemblages into said first chamber, said first and second housing means including means within said first chamber for positioning a film assemblage for exposure, means mounted on said first housing means for exposing the photosensitive element of said film assemblage positioned for exposure, said first housing means providing an optical path from said exposure means to said film assemblage, third housing means, means secured adjacent the other end of said first housing means for pivotally mounting said third housing means thereon, said third housing means being pivotable to a closed position wherein it cooperates with said first housing means to provide a second chamber adjacent said first chamber adapted to receive an exposed film assemblage from said first chamber during processing, portions of said second and third housing means cooperating, when in closed position, to provide a passage communicating between said first and second chambers, means mounted on said first and third housing means for effecting the distribution of said processing liquid on the photosensitive element of said exposed film assemblage during movement of the latter through said passage from said first to said second chamber, portions of said first and third housing means comprising means within said second chamber for positioning said exposed film assemblage during processing and for viewing, and means mounted within said second chamber on said first and third housing means for rendering visible a film assemblage positioned and processed within said second chamber.

6. Photographic apparatus for exposing the photosensitive element of a photographic film assemblage, processing the film assemblage by distributing a liquid upon said photosensitive element, and exhibiting the processed film assemblage, said apparatus comprising, in combination, first housing means, second housing means, means secured at one end of said first housing means for pivotally mounting said second housing means thereon, said second housing means being pivotable to a closed position wherein it cooperates with said first housing means to provide a first chamber in which a plurality of photographic film assemblages may be positioned during exposure and being pivotable into an open position to permit loading of a supply of film assemblages into said first chamber, said first and second housing means including guide means within said first chamber for positioning a film assemblage for exposure, exposure means including lens means mounted on said first housing means for exposing the photosensitive element of said film assemblage through the lenticular element of said film assemblage so as to produce a composite photographic record which may be exhibited in color, said first housing means providing an optical path from said lens means to said film assemblage positioned within said first chamber, third housing means, means secured adjacent the other end of said first housing means for pivotally mounting said third housing means thereon, said third housing means being pivotable to a closed position wherein it cooperates with said first housing means to provide a second chamber adjacent said first chamber and adapted to receive an exposed film assemblage from said first chamber during processing, portions of said second and third housing means cooperating, when in closed position, to provide a passage communicating between said first and second chambers and through which a film assemblage positioned within said first chamber may be advanced to said second chamber following exposure, other portions of said second and third housing means cooperating, when in closed position, to provide another passage extending exteriorly of the housing through which are adapted to extend leaders secured to said film assemblages, pressure-applying means mounted on said first and third housing means within said second chamber for engaging an exposed film assemblage during movement of the latter from said first to said second chamber to effect the distribution of a processing liquid upon the photosensitive element of said exposed film assemblage, portions of said first and third housing means comprising means within said second chamber for positioning said exposed film assemblage during processing and for viewing, and viewing means including an illumination source and optical means mounted within said second chamber on said first and third housing means for presenting in color the composite photographic record formed in said assemblage during processing in said second chamber.

7. Photographic apparatus for exposing, processing and exhibiting a photographic film assemblage, said apparatus comprising, in combination, a forward housing section, first and second rear housing sections, means mounting said rear housing sections side by side on said forward housing section for movement to and from closed positions, means dividing said forward housing section into first and second forward chambers, guide means for positioning a photographic film assemblage at the rear of said first forward chamber for exposure and at the rear of said second forward chamber for processing and viewing, exposure means mounted on said forward section at the front of said first forward chamber, viewing means including a source of illumination mounted on said forward section in said second forward chamber, said first rear section, when in closed position, cooperating with said forward section to provide a first rear chamber adapted to house a supply of film assemblages, said first rear section being movable to an open position to permit loading of a supply of film assemblages into said first rear chamber, said second rear section, when in closed position, cooperating with said forward section to provide a second rear chamber adapted to receive an exposed film assemblage from said first rear chamber during processing and for viewing, said second rear section being movable to an open position to permit the threading of a leader extending from said film assemblage positioned for exposure in said first rear chamber through said second rear chamber, means providing a lighttight passage from said first to said second rear chamber, pressure-applying means mounted on said forward and said second rear sections within said second forward and second rear chambers for engaging an exposed film assemblage during movement of the latter through said passage from said first to said second rear chamber to effect the distribution of a processing liquid within said exposed film assemblage, and means mounted on said second rear section within said second rear chamber for rendering visible a film assemblage positioned and processed therein.

8. Photographic apparatus comprising, in combination, a forward housing section, first and second rear housing sections, means mounting said rear housing sections side by side on said forward housing section for movement to and from closed positions, means dividing said forward housing section into first and second forward chambers, guide means for positioning a photographic film assemblage at the rear of said first forward chamber for exposure and at the rear of said second forward chamber for processing and viewing, exposure means including lens means mounted on said forward section at the front of said first forward chamber for exposing the photosensitive element of said film assemblage through the lenticular element of said film assemblage to produce a composite photographic record which may be exhibited in color, viewing means including a source of illumination mounted on said forward section in said second forward chamber, said first rear section, when in closed position, cooperating with said forward section to provide a first rear chamber adapted to house a supply of film assemblages, said first rear section being movable to an open position to permit loading of a supply of said film assemblages into said first rear chamber, said second rear section, when in closed position, cooperating with said forward section to provide a second rear chamber adapted to receive an exposed film assemblage from said first rear chamber during processing and for viewing, said second rear section being movable to an open position to permit the threading of a leader extending from said film assemblage positioned for exposure in said first rear chamber through said second rear chamber between said second rear section and said forward section, means providing a passage from said first rear chamber to said second rear chamber and adapted to receive said exposed film assemblage, pressure-applying means mounted on said forward and said second rear sections within said second forward and second rear chambers for engaging said exposed film assemblage during movement through said passage from said first to said second rear chamber to effect the distribution of a processing liquid within said exposed film assemblage, and viewing means mounted on said second rear section within said second rear chamber for exhibiting in color the composite photographic record formed in a film assemblage during processing within said second rear chamber.

9. Photographic apparatus comprising, in combination, a forward housing section, first and second rear housing sections, means mounting said rear housing sections side by side on said forward housing section for pivotal movement to and from closed positions, means dividing said forward housing section into first and second forward chambers, guide means for positioning a photographic film assemblage at the rear of said first forward chamber for exposure and at the rear of said second forward chamber for processing and viewing, exposure means including lens means mounted on said forward section at the front of said first forward chamber for exposing the photosensitive element of said film assemblage through the lenticular element of said film assemblage to produce a composite photographic record adapted to be exhibited in color, viewing means including optical means and a source of illumination mounted on said forward section in said second forward chamber, said first rear section, when in closed position, cooperating with said forward section to provide a first rear chamber adapted to house a supply of film assemblages, said first rear section being pivotable to an open position to permit loading of a supply of film assemblages into said first rear chamber, said second rear section, when in closed position, cooperating with said forward section to provide a second rear chamber, said second rear section being pivotable to an open position to permit the threading of a leader extending from said film assemblage positioned for exposure in said first rear chamber between said second rear section and said forward section, means defining a passage extending between said second rear section and said forward section exteriorly of said sections through which said leader may project, means providing another passage communicating between said first and second rear chambers adapted to receive an exposed film assemblage, pressure-applying means mounted on said forward and said second rear sections within said second forward and second rear chambers for engaging said exposed film assemblage during movement of the latter through the last-mentioned passage from said first to said second rear chamber to effect the distribution of a processing liquid within said exposed film assemblage, and viewing means mounted on said second rear section within said second rear chamber for presenting in color the composite photographic record formed in an exposed assemblage during processing within said second rear chamber.

10. Photographic apparatus comprising, in combination, a forward housing section, first and second rear housing sections, means mounting said rear housing sections side by side on said forward housing section for pivotal movement to and from closed positions, means dividing said forward housing section into first and second lighttight forward chambers, guide means for positioning a photographic film assemblage at the rear of said first forward chamber for exposure and at the rear of said second forward chamber for processing and viewing, exposure means mounted on said forward section at the front of said first forward chamber for so exposing the photosensitive element of said film assemblage through the lenticular element of said film assemblage as to produce a composite photographic record which may be exhibited in color, said exposure means including lens means and means for separating the taking light into primary colors, viewing means including a source of illumination and optical means including means for dividing the illuminating light into primary colors and mounted on said forward section in said second forward chamber, said first rear section, when in closed position, cooperating with said forward section to provide a first rear chamber adapted to house a supply of film assemblages, said first rear section being pivotable to an open position to permit loading of a supply of said film assemblages into said first rear chamber, said second rear section, when in closed position, cooperating with said forward section to provide a second rear chamber adapted to receive an exposed film assemblage from said first rear chamber during processing and for viewing, portions of said second rear section cooperating with portions of said forward section to provide a first passage from said second rear chamber exterior of said housing sections, said second rear section being pivotable to an open position to permit the threading of a leader extending from said film assemblage positioned for exposure in said first rear chamber through said second rear chamber between said second rear section and said forward section through said first passage, means providing a second passage communicating between said first and second rear chambers, pressure-applying means mounted on said forward and second rear sections within said second forward and second rear chambers for engaging said exposed film assemblage during movement of the latter through said second passage from said first to said second rear chamber to effect the distribution of a processing liquid upon the photosensitive element of said exposed film assemblage, and viewing means mounted on said rear section within said second rear chamber for presenting in color the composite photographic record formed in an assemblage during processing within said second rear chamber.

11. Photographic apparatus comprising, in combination, a forward housing section, first and second rear housing sections, means secured at one end of said forward housing section for pivotally mounting said first rear housing section, means secured adjacent the other end of said forward housing section for pivotally mounting said second rear housing section adjacent said first rear section, means dividing said forward housing section into first and second forward chambers, guide means for positioning a photographic film assemblage at the rear of said first forward chamber for exposure and at the rear of said second forward chamber for processing and viewing, exposure means including lens means mounted on said forward section at the front of said first forward chamber, viewing means including a source of illumination mounted on said forward section in said second forward chamber, said first rear section, when in closed position, cooperating with said forward section to provide a first rear chamber adapted to house a supply of film assemblages, said first rear section being movable to an open position to permit loading of a supply of film assemblages into said first rear chamber, portions of said first rear section providing a first passage between said first rear section and said forward section communicating with said first rear chamber, the leaders attached to film assemblages positioned within said first rear chamber extending through said first passage, means associated with said first passage for rendering the latter lighttight, said second rear section, when in closed position, cooperating with said forward section to provide a second rear chamber adapted to receive an exposed film assemblage from said first rear chamber during processing and for viewing, said second rear section being pivotable to an open position to permit the threading of a leader extending from said film assemblage positioned for exposure in said first rear chamber between said second rear section and said forward section, portions of said second rear section cooperating with said first rear section and said first passage in said first rear section to provide a light-free environment within which said exposed film assemblage may be advanced from said first rear chamber to said second rear chamber, pressure-applying means mounted on said forward and said second rear sections within said second forward and second rear chambers for engaging said exposed film assemblage during movement of the latter from said first to said second rear chamber to effect the distribution of a processing liquid upon the photosensitive element of said exposed film assemblage, and means mounted on said second rear section within said second rear chamber for making visible a film assemblage positioned and processed therein.

12. Photographic apparatus for exposing the photosensitive element of a film assemblage, processing said film assemblage with a liquid distributed on said photosensitive element, and exhibiting the processed film assemblage, said apparatus comprising, in combination, a forward housing section, first and second rear housing sections, means secured at one end of said forward housing section for pivotally mounting said first rear housing section, means secured adjacent the other end of said forward housing section for pivotally mounting said second rear housing section adjacent said first rear housing section, means dividing said forward housing section into first and second forward chambers, guide means for positioning a photographic film assemblage at the rear of said first forward chamber for exposure and at the rear of said second forward chamber for processing and viewing, exposure means mounted on said forward section at the front of said first forward chamber, said exposure means including lens means and means for separating the taking light into primary colors for exposing the photosensitive element of said film assemblage through the lenticular element of said film assemblage to produce a composite photographic record which may be exhibited in color, means mounted on said forward section within said second forward chamber for illuminating a film assemblage positioned for viewing at the rear of said second forward chamber, optical means associated with said illuminating means and including means for separating the illuminating light into the same primary colors as in taking, said first rear section, when in closed position, cooperating with said forward section to provide a first rear chamber adapted to house a supply of film assemblages and to provide a lighttight environment in which each of said film assemblages is positioned for exposure, said first rear section being movable to an open position to permit loading of a supply of film assemblages into said first rear chamber, portions of said first rear chamber providing a passage between said first rear section and said forward section communicating with said first rear chamber, permitting leaders attached to film assemblages positioned within said first rear chamber to extend therethrough, means associated with said passage for rendering the latter lighttight, said second rear section, when in closed position, cooperating with said forward section to provide a second rear chamber adapted to receive an exposed film assemblage from said first rear chamber during processing and for viewing, said second rear section being pivotable to an open position to permit the threading of a leader extending from said film assemblage positioned for exposure in said first rear chamber through said second rear chamber between said second rear section and said forward section, portions of said second rear section cooperating with said first rear section and said passage in said first rear section to provide a light-free environment in which said exposed film assemblage may be advanced through said passage from said first rear chamber to said second rear chamber, pressure-applying means mounted on said forward and said second rear sections within said second forward and second rear chambers for engaging said exposed film assemblage during movement of the latter from said first to said second rear chamber to effect the distribution of a processing liquid upon the photosensitive element of said exposed film assemblage, and viewing means mounted on said second rear section within said second rear chamber for presenting in color the composite photographic record produced in a film assemblage positioned and processed within said second rear chamber.

13. Photographic apparatus comprising, in combination, a forward housing section, first and second rear housing sections, means secured to said forward housing section adjacent one end thereof for pivotally mounting said first rear housing section, means secured to said forward housing section adjacent the other end thereof for pivotally mounting said second rear housing section adjacent said first rear housing section when said sections are in closed position, means dividing said forward housing section into first and second forward chambers, guide means for positioning a photographic film assemblage at the rear of said first forward chamber for exposure and at the rear of said second forward chamber for processing and viewing, exposure means mounted on said forward section at the front of said first forward chamber, viewing means including a source of illumination mounted on said forward section in said second forward chamber, said first rear section, when in closed position, cooperating with said forward section to provide a first rear chamber adapted to house a supply of film assemblages, said first rear section being pivotable to an open position to permit loading of a supply of film assemblages into said first rear chamber, portions of said first rear section, when in closed position, cooperating with portions of said forward section to provide a first passage communicating with said first rear chamber through which a film assemblage may be withdrawn, means associated with said first rear section for rendering said first passage lighttight during withdrawal of an exposed film assemblage from said first rear chamber and with leaders attached to film assemblages positioned within said first rear chamber extending through said first passage, said second rear section, when in a closed position, cooperating with said forward section to provide a second rear chamber adapted to receive an exposed film assemblage from said first rear chamber during processing and for viewing, portions of said second rear section, when the latter is in closed position, cooperating with portions of said forward section to provide a second passage adjacent said other end of said forward section, said second rear section being pivotable to an open position to permit the threading of a leader through said second passage, means within said second passage for rendering the latter lighttight, portions of said second rear section cooperating with portions of said first rear section, when said rear sections are in closed position, to provide a third passage extending between said first and second rear sections exteriorly of said sections and through which leaders secured to film assemblages positioned within said first rear chamber project exteriorly of said sections, portions of said second rear section cooperating with portions of said first rear section, when said rear sections are in closed position, to provide a lighttight environment in which said exposed film assemblage may be advanced from said first rear chamber through said first passage to said second rear chamber, means within said second rear chamber for effecting the distribution of a processing liquid on the photosensitive element of said exposed film assemblage during movement of the latter from said first to said second rear chamber, and means mounted on said second rear section within said second rear chamber for rendering visible a film assemblage positioned and processed therein.

14. Photographic apparatus comprising, in combination, a forward housing section, first and second rear housing sections, means secured to said forward housing section adjacent one end thereof for pivotally mounting said first rear housing section, means secured to said forward housing section adjacent the other end thereof for pivotally mounting said second rear housing section adjacent said first rear housing section when said sections are in a closed position, means dividing said forward housing section into first and second forward chambers, guide means for positioning a photographic film assemblage at the rear of said first forward chamber for exposure and at the rear of said second forward chamber for processing and viewing, exposure means mounted on said forward section at the front of said first forward chamber, said exposure means including lens means and means for separating the taking light into primary colors for exposing the photosensitive element of said film assemblage through the lenticular element of said film assemblage to produce a composite photographic record capable of being exhibited in color, means mounted on said forward section within said second forward chamber for illuminating a film assemblage positioned for viewing at the rear of said second forward chamber, optical means associated with said illumination means and including means for separating the illuminating light into the same primary colors as in taking, said first rear section, when in closed position, cooperating with said forward section to provide a first rear chamber adapted to house a supply of film assemblages, said first rear section being pivotable to an open position to permit loading of a supply of film assemblages into said first rear chamber, portions of said first rear section, when in closed position, cooperating with portions of said forward section to provide a first passage at the end of said first rear chamber opposite said one end of said forward sectoin communicating with said first rear chamber, means associated with said first rear section for rendering said first passage lighttight during withdrawal of an exposed film assemblage from said chamber and with leaders attached to said exposed film assemblage positioned within said first rear chamber extending through said first passage, said second rear section, when in closed position, cooperating with said forward section to provide a second rear chamber adapted to receive said exposed film assemblage from said first rear chamber during processing and for viewing, portions of said second rear section, when the latter is in closed position, cooperating with portions of said forward section to provide a second passage adjacent said other end of said forward section and through which a leader secured to a film assemblage and extending through said second rear chamber between said second rear and forward sections may project exteriorly of said sections, said second rear section being pivotable to an open position to permit the threading of a leader through said second passage, means within said second passage for rendering the latter lighttight, portions of said second rear section cooperating with portions of said first rear section, when said rear sections are in closed position, to provide a third passage extending between said first and second rear sections exteriorly of said sections and through which leaders secured to film assemblages positioned within said first rear chamber project exteriorly of said sections, portions of said second rear section cooperating with portions of said first rear section, when said rear sections are in closed position, to provide a lighttight environment in which said exposed film assemblage may be advanced from said first rear chamber through said first passage to said second rear chamber, means within said second rear chamber for effecting the distribution of a processing liquid within said exposed film assemblage during movement of the latter from said first to said second rear chamber, and viewing means mounted on said second rear section within said second rear chamber for presenting in color the composite photographic record formed within a film assemblage positioned and processed within said second rear chamber.

15. Photographic apparatus comprising, in combination, a forward housing section, first and second rear housing sections, means pivotally mounting said first and second rear housing sections side by side on said forward housing section for movement to and from closed position, means dividing said forward housing section into first and second forward chambers, guide means for positioning a photographic film assemblage substantially in a plane at the rear of said first forward chamber for exposure and at the rear of said second forward chamber for processing and viewing, exposure means mounted on said forward section at the front of said first forward chamber for exposing said film assemblage positioned for exposure, viewing means mounted on said forward section in said second forward chamber, said first rear section, when in closed position, cooperating with said forward section to provide a lighttight first rear chamber adapted to house a supply of film assemblages and to provide a lighttight environment in which each of said film assemblages is positioned for exposure, said first rear section being pivotable to an open position to permit loading of a supply of film assemblages into said first rear chamber, said second rear section, when in closed position, cooperating with said forward section to provide a lighttight second rear chamber adapted to receive an exposed film assemblage from said first rear chamber during processing and for viewing, said second rear section being pivotable to an open position to permit the threading of a leader extending from a film assemblage positioned for exposure in said first rear chamber through said second rear chamber between said second rear section and said forward section, means providing a lighttight passage extending from said first rear chamber to said second rear chamber for permitting the movement of said exposed film assemblage therethrough, a pair of pressure-applying members between which said exposed film assemblage is adapted to be advanced from said first rear chamber to said second rear chamber to effect the distribution of a processing liquid upon the photosensitive element of said exposed film assemblage, one of said pressure-applying members being mounted on said forward section in said second forward chamber, the other of said pressure-applying members being mounted on said second rear section in said second rear chamber in juxtaposition with said one pressure-applying member when said second rear section is in closed position, resilient means mounted on said second rear section for urging said one pressure-applying member toward said other pressure-applying member, and means mounted on said second rear section within said second rear chamber for rendering visible a film assemblage positioned and processed therein.

16. Photographic apparatus comprising, in combination, a forward housing section, first and second rear housing sections, means pivotally mounting said first and second rear housing sections side by side on said forward housing section for movement to and from closed position, means dividing said forward housing section into lighttight first and second forward chambers, guide means for positioning a photographic film assemblage substantially in a plane at the rear of said first forward chamber for exposure and at the rear of said second forward chamber for processing and viewing, exposure means mounted on said forward section at the front of said first forward chamber, said exposure means including lens means and means for separating the taking light into primary colors so as to expose the photosensitive element of said film assemblage through a lenticular element included in said film assemblage to produce a composite photographic record which may be viewed in color, means mounted on said forward section in said second forward chamber for illuminating a film assemblage positioned for viewing at the rear of said second forward chamber, optical means associated with said illuminating means and including means for separating the illuminating light into the same primary colors as in taking, said first rear section, when in closed position, cooperating with said forward section to provide a first rear chamber adapted to house a supply of film assemblages, said first rear section being pivotable to an open position to permit loading of a supply of film assemblages into said first rear chamber, said second rear section, when in closed position, cooperating with said forward section to provide a second rear chamber adapted to receive an exposed film assemblage from said first rear chamber during processing and for viewing, said second rear section being pivotable to an open position to permit the threading of a leader extending from said exposed film assemblage positioned for exposure in said first rear chamber through said second rear chamber between said second rear section and said forward section, means defining a passage joining said first and second rear chambers, a pair of pressure-applying members between which said exposed film assemblage is adapted to be advanced through the last-mentioned passage from said first to said second rear chamber to effect the distribution of a processing liquid within said exposed film assemblage, one of said pressure-applying members being mounted on said forward section in said second forward chamber, the other of said pressure-applying members being mounted on said second rear section in said second rear chamber in juxtaposition with said one pressure-applying member when said second rear section is in closed position, resilient means mounted on said second rear section for urging said pressure-applying members toward one another, and viewing means mounted on said second rear section within said second rear chamber for exhibiting in color the composite photographic record formed within a film assemblage positioned and processed within said second rear chamber.

17. Photographic apparatus for exposing, processing and exhibiting photographic film assemblages, each including a photosensitive element, a second element and means containing a processing liquid, said apparatus comprising, in combination, a first housing means, a second housing means mounted on said first housing means for movement between a first position wherein it cooperates with said first housing means to provide a first chamber for containing a supply of said film assemblages during exposure, and a second position wherein said first chamber is open to allow loading of said assemblage into said first chamber, guide means within said first chamber for successively positioning said film assemblages for exposure, means mounted on said first housing means for exposing the photosensitive element of a film assemblage positioned for exposure, said first housing means providing an optical path for transmitting light from said exposure means to a film assemblage positioned for exposure within said first chamber, third housing means mounted on said first housing means for movement between a first position wherein said third housing means cooperates with said first housing means to provide a second chamber adapted to receive a film assemblage from said first chamber during processing and cooperates with said second housing means to provide a passage connecting said first and second chambers, and a second position wherein said second chamber is open to permit access to a film assemblage within said second chamber and to permit threading of portions of said film assemblages through said passage, means within said passage for guiding a film assemblage from said first to said second chamber, means within said second chamber for engaging a film assemblage during movement of the latter through said passage from said first to second chamber to effect the distribution of said processing liquid within said assemblage between said photosensitive and second elements, means within said second chamber for positioning a film assemblage during processing and for viewing, and viewing means within said second chamber including a source of illumination for exhibiting photographic records formed in said film assemblage during processing within said second chamber.

18. Photographic apparatus for exposing, processing and exhibiting photographic film assemblages, said apparatus comprising, in combination, a first housing means, second housing means movably secured to said first housing means, said second housing means being movable into an operative position wherein it cooperates with said first housing means to provide a first chamber for containing a supply of said film assemblages during exposure, guide means within said first chamber for successively positioning said film assemblages for exposure, means mounted on said first housing means for exposing the photosensitive element of each of said film assemblages, positioned for exposure, said first housing means providing an optical path for transmitting light from said exposure means to a film assemblage positioned for exposure within said first chamber, third housing means movably mounted on said first housing means and movable to an operative position adjacent said second housing means wherein said third housing means cooperates with said first housing means to provide a second chamber adapted to receive a film assemblage from said first chamber during processing, portions of said second and third housing means cooperating to provide a passage connecting said first and second chambers when said second and third housing means are in operative position, means within said passage for guiding a film assemblage from said first to said second chamber, pressure-applying means within said second chamber for engaging the last-mentioned film assemblage during movement of the latter from said first to said second chamber to effect the distribution of a processing liquid within said last-mentioned assemblage, means within said second chamber for positioning said last-mentioned film assemblage during processing and for viewing, and viewing means within said second chamber and including a source of illumination for exhibiting a film assemblage positioned within said second chamber, and processed therein.

References Cited in the file of this patent

UNITED STATES PATENTS

| 2,373,114 | Goldsmith | Apr. 10, 1945 |
| 2,477,324 | Wolff | July 26, 1949 |
| 2,688,278 | Tuttle | Sept. 7, 1954 |

UNITED STATES PATENT OFFICE
CERTIFICATE OF CORRECTION

Patent No. 2,854,903                          October 7, 1958

Edwin H. Land et al.

It is hereby certified that error appears in the above numbered patent requiring correction and that the said Letters Patent should read as corrected below.

Column 1, lines 50 and 51, for "photographs" read -- photographic --; column 6, line 19, for "22" read -- 24 --; column 10, line 9, after "184" insert -- and --; column 11, line 10, for "assembly" read -- assemblage --; column 19, line 17, for "sectoin" read -- section --.

Signed and sealed this 26th day of December 1961.

(SEAL)
Attest:

ERNEST W. SWIDER                             DAVID L. LADD
Attesting Officer                                Commissioner of Patents

USCOMM-DC